United States Patent

[11] 3,580,384

| [72] | Inventor | Robert J. Pingree |
| | | Torrance, Calif. |
| [21] | Appl. No. | 794,194 |
| [22] | Filed | Jan. 27, 1969 |
| [45] | Patented | May 25, 1971 |
| [73] | Assignee | Ameron, Inc. |
| | | Monterey Park, Calif. |

[54] MATERIAL FEEDING APPARATUS
6 Claims, 3 Drawing Figs.

[52] U.S. Cl. .................................................. 198/64,
198/214
[51] Int. Cl. ............................................ B65g 33/26
[50] Field of Search ........................................... 198/64,
213, 214; 222/412; 214/83.32, 519

[56] References Cited
UNITED STATES PATENTS

| 1,525,506 | 2/1925 | Lauterbur ................ | 198/64X |
| 3,093,271 | 6/1963 | Douglas ..................... | 198/64X |
| 3,283,925 | 11/1966 | Gutekunst ................. | 198/64X |

*Primary Examiner*—Albert J. Makay
*Attorney*—Christie, Parker & Hale

ABSTRACT: Screw conveyor means for elevating a relatively thick wet fluid substance, such as cement mortar, in which a first conveyor screw feeds toward a conduit of less diameter containing a second conveyor screw connected to the first by a universal joint located at a point ahead of a converging conduit section at the intake end of the conduit.

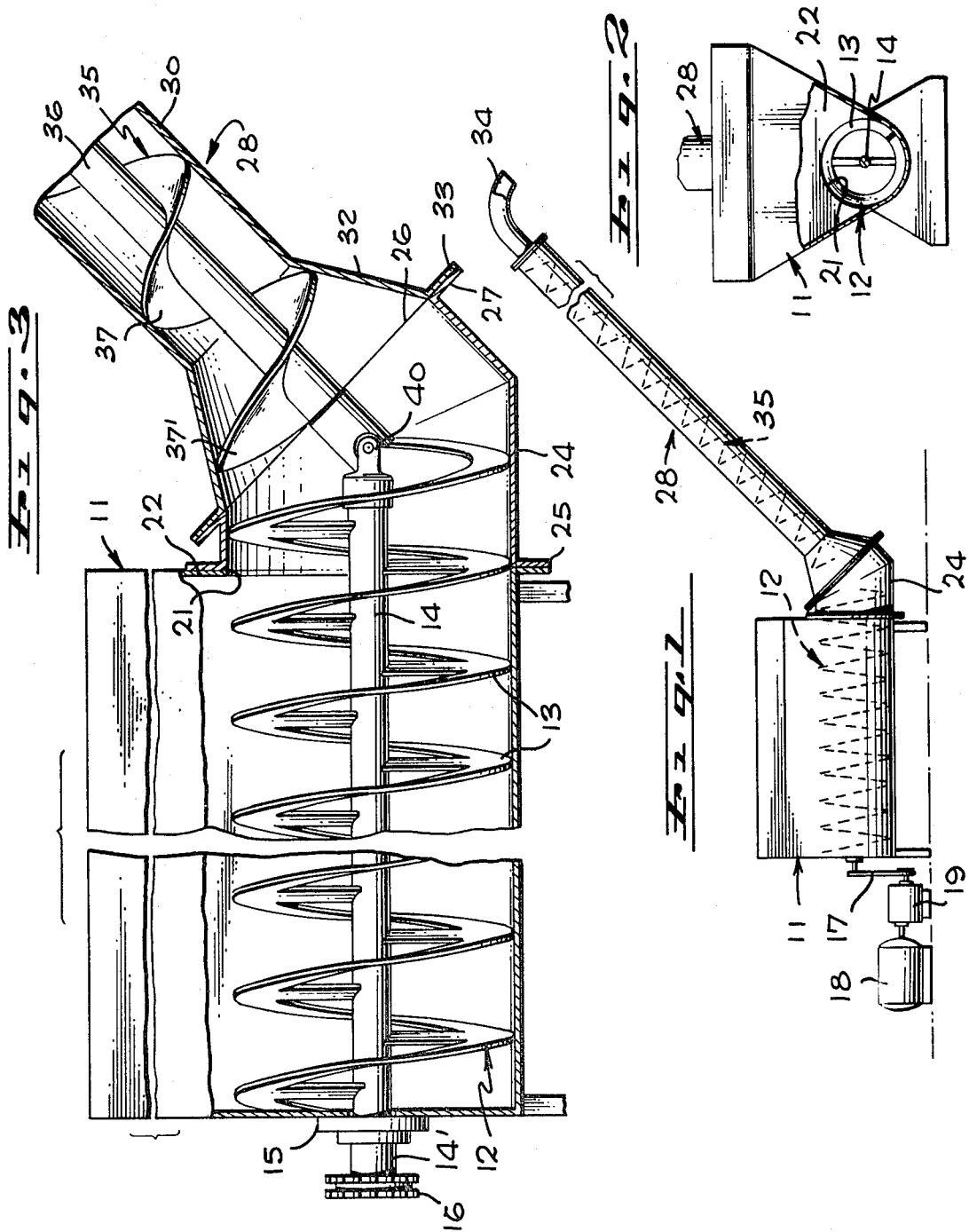

MATERIAL FEEDING APPARATUS

The invention relates generally to screw conveyors and particularly to conveyors adapted for use in raising a relatively thick wet fluid substance, such as cement mortar, to a higher elevation.

Heretofore it has been the practice in elevating cement mortar to feed the same from a hopper by means of a relatively large-diameter first conveyor screw into a converging conduit section connected to a delivery conduit of smaller diameter and containing a second conveyor screw, the two screws being connected by a universal joint within the delivery conduit and at a point downstream of the converging conduit section. Since the converging section requires solid flighting on the screw, there is a tendency for the material to cavitate and flow in a turbulent manner in the region of the universal joint, thereby adversely affecting the pickup of the material by the smaller screw in the delivery conduit.

An object of the present invention is to provide a new and improved construction to eliminate or minimize the production of turbulence and cavitation in the delivery conduit at a point where it will interfere with pickup and delivery of the material or substance being moved by the delivery screw.

More particularly it is an object to provide a novel construction in which any cavitation and turbulence which may be produced at the juncture of the two screws, which intersect at an included angle between 90° and 180°, takes place ahead of the converging conduit section, or pressure cone, and also to provide a construction whereby excess pressure can be relieved rearwardly axially of the first conveyor screw or upstream of the moving mass of material.

Another object is to provide a device in which the overall efficiency is improved over current devices.

By way of summary, it is an object to provide apparatus for elevating a thick, wet substance, such as cement mortar, by use of two conveyor screws of different diameters disposed at an included angle between 90° and 180° and connected by a universal joint wherein the connection is located upstream of the smaller-diameter screw and ahead of a converging section in a conduit. These and other objects will be apparent from the drawing and the following description. Referring to the drawing:

FIG. 1 is a side elevational view of apparatus embodying the invention;

FIG. 2 is an end elevational view of the hopper of FIG. 1 partially broken away to show the far wall and opening therein, but on a larger scale; and FIG. 3 is a central longitudinal sectional view, partly broken away, of the apparatus of FIG. 1, but on a larger scale.

More particularly describing the invention, numeral 11 generally designates a hopper which may be open topped for the reception of mortar or other substance to be conveyed and elevated. The hopper is shown provided with a conveyor screw, designated generally 12. This has open helical flighting 13 on a shaft 14 which is journaled at 15. A projecting shaft section 14' has sprockets 16 fixed to it to receive chains 17 driven by a motor 18 through suitable gear reduction means 19. At one side or one end the hopper is formed with a circular opening 21 in upright wall 22 through which the screw 12 projects. A conduit section 24 forms a continuation of the opening, being bolted or otherwise secured to the hopper through a flange 25. The conduit section is so shaped as to provide an upwardly facing inclined end 26 that has an external flange 27. A delivery tube or conduit, designated generally by numeral 28, includes a main section 30 which is cylindrical and a frustoconical converging section 32 at the lower end. The latter is flanged at 33 to bolt or otherwise be secured to the flange 27 of section 24. The outer end of conduit 28 is provided with a half-elbow deflector 34 for directing material issuing from the conduit 30.

Within the conduit 28 is a conveyor screw 35 which includes the shaft 36 and continuous solid flighting 37 including the portion 37' which fits within the frustoconical or converging section 32. By the term "solid flighting" is meant that the helical vane 37 on the axle or shaft 36 is continuous both helically and radially and that its diameter is only slightly less than the inner diameter of the conduit 28.

The two screws are connected by a universal joint 40, this joint being located upstream of the converging frustoconical section 32 of the device, that is, between such section and the hopper.

With the construction outlined, any cavitation or turbulence which may be introduced in the region of the intersection of the two shafts of the conveyor screws by reason of their meeting at an angle other than 180° is at a point ahead of the converging frustoconical section 32, often termed the pressure cone, and consequently any fed material can freely pass back through the open flighting 13 of screw 12 thereby providing for undisturbed laminar flow of material through the pressure cone and the conduit 28.

I claim:

1. Conveyor means for elevating a wet relatively thick fluid substance such as cement mortar, comprising a hopper adapted to receive the substance, said hopper having an opening at one side, an inclined upwardly extending delivery conduit of smaller diameter than said opening, a junction conduit means between said hopper and said delivery conduit forming an extension of said opening and including a frustoconical section adjacent and on the same axis as said delivery conduit, a first conveyor screw in said hopper extending through said opening and into said junction conduit means, a second conveyor screw in said delivery conduit, the axes of said conveyor screws intersecting at a point between the hopper and said frustoconical section, universal joint means connecting said screws at said point, and means for rotating one of said screws.

2. The conveyor means set forth in claim 1 in which the first conveyor screw is characterized by open flighting, and in which the second conveyor screw is characterized by solid flighting.

3. The conveyor means set forth in claim 2 in which the flighting of said second conveyor screw extends into said frustoconical section of the junction conduit means.

4. The conveyor means set forth in claim 2 in which the first conveyor screw has the capacity to deliver more material than can be taken by said second conveyor screw.

5. Conveyor means for a wet relatively thick fluid substance such as cement mortar, comprising an encasement adapted to receive the substance and having a discharge opening, a delivery conduit of smaller diameter than said discharge opening and extending at an angle of between 90° and 180° with respect to said opening, a junction conduit means between said encasement and said delivery conduit forming an extension of said opening and including a frustoconical section adjacent and on the same axis as said delivery conduit, a first conveyor screw in said encasement and extending through said opening into said junction conduit means, a second conveyor screw in said delivery conduit, said second conveyor screw being characterized by solid flighting, the axes of said conveyor screws intersecting at a point between the hopper and said frustoconical section, universal joint means connecting said screws at said point, and means for rotating one of said screws.

6. The conveyor means set forth in claim 5 in which the flighting of said first conveyor screw does not effectively occupy the entire cross-sectional are of said opening and junction conduit means available for the substance to be conveyed whereby buildup of excess pressure ahead of said first conveyor screw is relieved rearwardly axially of said screw.